Figure 1:
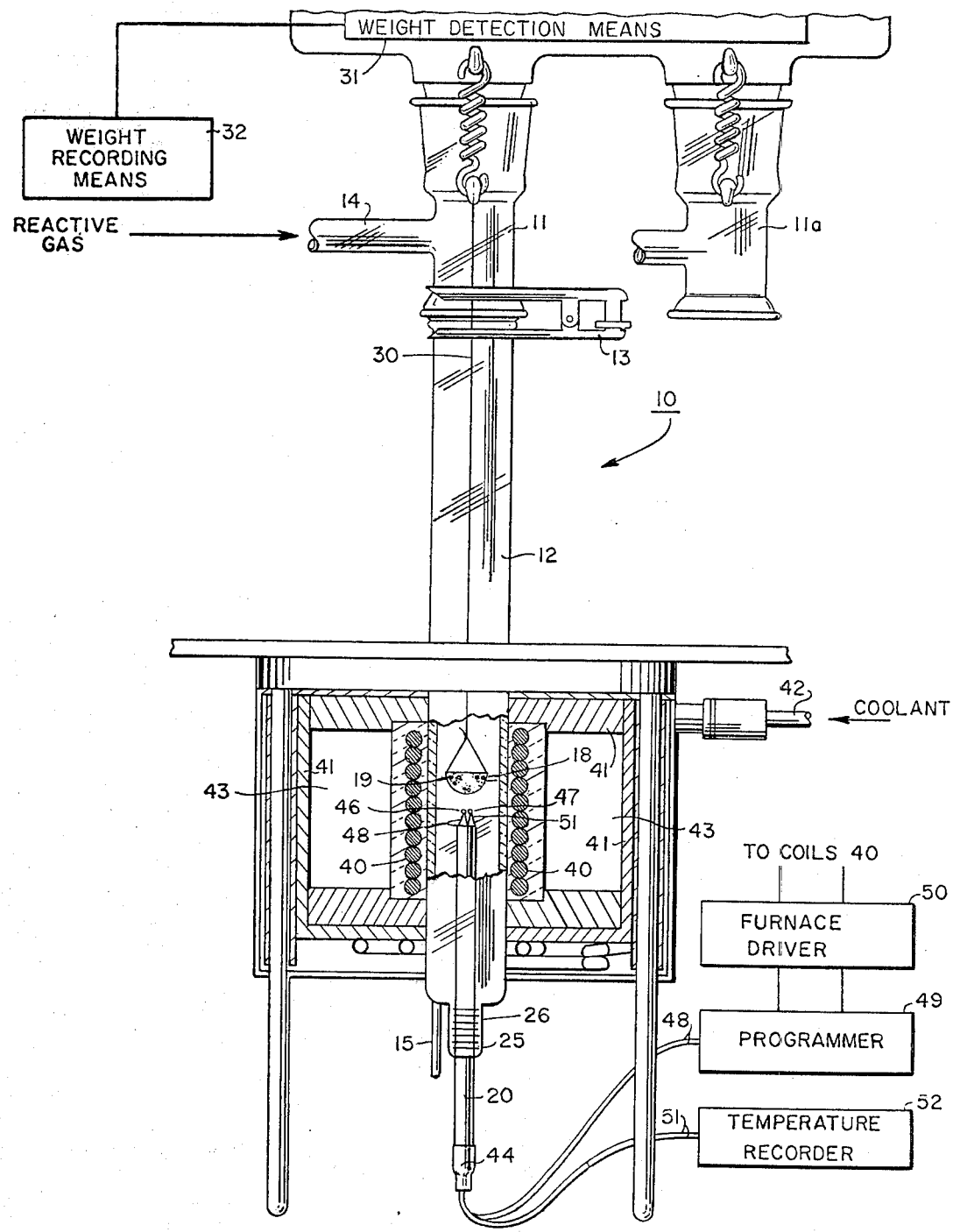

United States Patent [19]

Harlan et al.

[11] 3,902,354

[45] Sept. 2, 1975

[54] THERMOGRAVIMETRIC ANALYSIS APPARATUS

[75] Inventors: Robert E. Harlan; Frank E. Roberts, both of Austin, Tex.

[73] Assignee: Columbia Scientific Industries Corporation, Austin, Tex.

[22] Filed: Feb. 13, 1973

[21] Appl. No.: 332,178

Related U.S. Application Data

[63] Continuation of Ser. No. 878,303, Nov. 20, 1969, abandoned.

[52] U.S. Cl. ................................................ 73/15 B
[51] Int. Cl. ...................... G01k 17/04; G01n 25/20
[58] Field of Search ....................................... 73/15

[56] References Cited
UNITED STATES PATENTS

| 3,055,206 | 9/1962 | Watson et al. | 73/15 |
| 3,303,689 | 2/1967 | Pawlik et al. | 73/15 |

OTHER PUBLICATIONS

Tokar et al., "The Method of Differential Calorimetry Combined with Simultaneous Calibration and Thermogravimetry," in Keramik–Glass–Email, pp. 239–243, 1962.

Weidemann et al., "Thermogravimetric Investigations IX," in Mettler Corporation Reprint, Feb. 1966.

Biermann et al., "A Simple Thermobalance for Studies over a Pressure Range of 0–60 Atmospheres," in Canadian Journal of Chem., pp. 1361–1367, July 1962.

Chapman et al., "Volatility of $UO_{2\ _{1X}}$ & Phase Relations in The System Uranium–Oxygen," in J. of the Amer. Ceramic Society, Dec. 1964, pp. 617. 17.

*Primary Examiner*—Herbert Goldstein
*Attorney, Agent, or Firm*—Kenneth R. Glaser

[57] ABSTRACT

Disclosed is thermogravimetric analysis apparatus having sample holding means suspended within a sealed enclosure, which temperature and atmospheric contents are automatically controlled. A thermocouple probe is slidably inserted through a gas and air tight seal at the lower end of the sealed enclosure and positioned near the sample holding means. Weight and temperature detecting and recording means monitor the weight or mass change of the sample material as a function of temperature.

4 Claims, 2 Drawing Figures

THERMOGRAVIMETRIC ANALYSIS APPARATUS

This is a continuation of application Ser. No. 878,303, filed Nov. 20, 1969 now abandoned.

This invention pertains to thermogravimetric analysis apparatus, and more particularly to a thermocouple support arrangement utilized in such apparatus.

Thermogravimetric analysis (TGA) is a widely employed technique for investigating and measuring weight or mass changes of sample material as a function of temperature. While various refinements and improvements have been incorporated into TGA apparatus over the years, modern TGA apparatus is basically composed of four separate but interrelated subsystems. First, there is the furnace and temperature control system which automatically determines and regulates the temperature increase to the sample material. Second, there is the environmental control system which determines the pressure and contents of the atmosphere to which the test sample is subjected. Third, there is the weight detection and recording system which ordinarily includes a balance mechanism supporting the material to be analyzed and recording means for measuring weight changes represented by changes in the balance. Fourth, there is the temperature recording system which monitors and measures the instantaneous temperature at the sample, which readings may then be plotted simultaneously with the recorded weight information.

The environmental control system generally includes a sealed enclosure, the sample material holder being suspended from the balance mechanism inside this enclosure. Disposed about the enclosure and surrounding the sample material is the furnace system for heating the enclosure cavity, and thus the material, to the desired temperature. In accordance with prior art design, the measurement and control of the temperature at the sample are provided by a pair of conventional thermocouples, each separately suspended within the environmental control enclosure adjacent the sample material holder. One of these thermocouples, referred to as the reference thermocouple, measures the temperature at the sample to determine at what temperature or temperatures a weight or mass change occurs. The other thermocouple, referred to as the program thermocouple, provides the necessary temperature feedback information to a programmed furnace driver, thereby to regulate the extent and duration of the heating cycle.

Various difficulties and disadvantages are encountered, however, due to this prior art design. Since each of the thermocouples, as well as the sample material holder are suspended separately, it becomes extremely difficult to accurately position each of the thermocouples with respect to the holder. This is particularly difficult since the length dimension of the hangdown or thermocouple lead wires is considerably greater than the space dimensions within the enclosure.

Additionally, in order to most accurately monitor the temperature at the sample, it is necessary to bend the thermocouple beads inwardly and at right angles to their associated leads in order to position these beads directly underneath the sample holder. This not only increases the difficulty of placement of the thermocouples vis a vis the holder, but introduces errors in the temperature detection system due to the existing temperature differential between each lead wire and the bead itself. This temperature differential exists due to the fact that the coolest portion of the cavity within the enclosure is at the center where the sample and thermocouple beads are located, the temperature increasing toward the walls of the enclosure. Since the thermocouple lead wires are thus located in the hotter portion of the cavity, this excessive heat is transmitted by conduction to the thermoelectric junction at the bead, thus falsely indicating a higher temperature at the sample than is actually present.

Another disadvantage of this prior art system is that when one wishes to adjust the position of the hangdown wire from which the sample holder is suspended to measure weight changes in various ranges, it is necessary to dismantle the whole thermocouple and balance mechanism, and then reposition all of the members accurately. This repositioning becomes extremely critical when accurate comparisons need to be established between subsequent analytical runs.

It is therefore a primary object of the invention to provide improvements to TGA apparatus.

It is another object of the invention to provide a new and improved temperature monitoring system for TGA apparatus which is easily installed and produces extremely accurate readings.

It is still a further object to provide a novel thermocouple probe design for TGA apparatus for accurately measuring and controlling the temperature at a sample suspended within said apparatus.

In accordance with these and other objects, the TGA apparatus of the present invention includes an elongated gas tight enclosure in which the sample being tested is suspended. Disposed at the base of the enclosure is a protuberance fitted with an appropriate sliding gasket or fitting, through which a thermocouple probe is inserted. Temperature sensing thermocouples are disposed at the upper end of this probe, the lead wires coupled to the thermocouple bead extending through the body of the probe and being respectively coupled to temperature recording and programming means. The gasket not only provides a tight seal between the probe body and the enclosure, but enables the probe to be easily raised or lowered, thereby to accurately position the thermocouple beads directly beneath the material holder.

Figure 2:
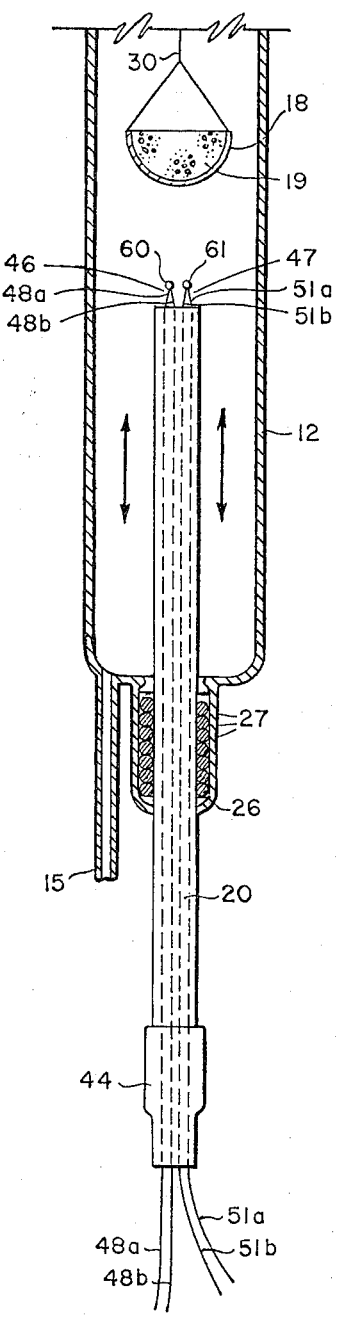

Other objects, features, and advantages of the present invention are more fully detailed in the following description, taken in conjunction with the accompanying drawings, wherein:

FIG. 1 is a partially sectional and partially schematic illustration of thermogravimetric analysis equipment utilizing the novel features of the invention; and FIG. 2 is a detailed view of the thermocouple probe construction and fitting.

The drawings are not necessarily to scale, but in particular instances have been exaggerated to emphasize particular features of the invention.

Referring now to FIG. 1, there is depicted thermogravimetric analysis equipment 10 incorporating the novel design of the present invention. Basically, the equipment includes the environmental control system, the weight detection and recording system, the furnace or heating control system, and temperature recording apparatus.

The environmental control system includes a pair of gas and air tight enclosures 11 and 12 secured together in hermetically sealed relationship by clamp means 13. Suspended within the two enclosures 11 and 12 is a sample material holding cup 18, the changes of mass or weight of the material 19 contained therein to be recorded as a function of temperature. An entrance port or conduit 14 is provided in the upper enclosure 11 to enable the flow of reactive gas of desired composition to enter the environmental control system and bathe the sample material 19 during the thermogravimetric analysis, an exit port 15 for this gas being provided at the end of the elongated enclosure 12. Various materials may be employed in the construction of the enclosures 11 and 12, for example glass or stainless steel, which do not undesirably react with the gas entering the port 14 and which effectively isolate the material 19 from the outside atmosphere.

As a specific feature of the invention, the lower end of the elongated tube 12 is provided with a gasket or fitting 25 through which a thermocouple probe 20, subsequently to be described, is inserted. Various types of gaskets may be employed which enable the insertion of the probe 20 therethrough while also assuring a close fitting, gas tight seal between the neck 26 of the tube 12 and the probe 20. In the specific example illustrated in FIGS. 1 and 2, a series of O-rings 27 provide such a seal.

The weight detection and recording system includes the hangdown wire 30 from which the material holding cup 18 is suspended; weight detection means 31, and recording means 32 for respectively detecting and recording weight changes of the material 19. Various conventional systems may be employed for detecting and recording these weight changes, the specifics of the detection and recording systems not being part of the present invention. As one specific example, however, the Cahn Model RG or RF ELECTRO-BALANCE was employed as the weight detection and recording system.

Disposed around the lower portion of the elongated hangdown tube 12 is a furnace system which includes heating coils 40 and a furnace driver 50 for providing power to coils 40. Desirably, the heating coils are symmetrically disposed about the tube 12 to provide uniform heating to the cavity therein (and consequently to the material 19 contained within the cup 18). A cooling jacket 41 coupled to a conduit 42 through which coolant passes, surrounds the chamber 43 and provides for the cooling of the system after completion of the specific analytical run.

Disposed at the upper tip of the probe 20 are a pair of thermocouples 46 and 47. One of the thermocouples 46 serves as a feedback program thermocouple and has its lead wires 48 coupled to a programmer 49 for controlling the furnace driver 50, thereby to provide a programmed rate of temperature increase to the material 19. The programmer 49 compares the electomotive force representing the desired cavity temperature internally generated by the programmer 49, any differences between these two EMFs activating the furnace driver. The other thermocouple 47, referred to as the reference thermocouple, has its lead wires 51 coupled to temperature recording means 52 for recording the instantaneous temperature at the sample cup 18. To assure a leak free assembly, the probe 20 is sealed at the lower end around the leads emerging therefrom, a piece of shrink tubing 44 disposed about this seal.

According to the operation of the thermogravimetric apparatus illustrated in FIG. 1, the sample holder 18 with the material 19 to be tested is initially suspended by way of the hangdown wire 30 into the portion of the lower tube 12 surrounded by the heater coils 40. The clamp 13 then secures the upper encloosure 11 to the lower tube 12 to provide the gas the air tight environmental control chamber around the material sample. After the material holder 18 is lowered to the desired position, the probe 20 is inserted upward through the neck 26 into the tube 12 to a position which enables the beads of the thermocouples 46 and 47 to be disposed adjacent the cup 18.

The furnace driver 50 and programmer 49 are then set and activated to provide a controlled temperature increase to the interior or cavity of the enclosure 12 (and consequently the material 19). In this regard, the thermocouple 46 continually monitors the temperature at the sample to feed back this information to the programmer 49. Weight or mass changes of the sample material 19 detected by the means 32 are then simultaneously plotted with the instantaneous temperature of the material recorded by the thermocouple 47 and recorder means combination 52. The quality and content of the environment surrounding the material 19 may then be altered, if desired, by introducing gases of desired composition into the conduit 14, the conduit 15 providing exit means for these gases and/or their reactive by-products.

Referring now to FIG. 2, there is described the specific details of the probe 20 and its relationship to the lower tube or enclosure 12 into which it is inserted. The elongated body portion of the probe 20 is constructed of electrically insulating material, for example porcelain, to effectively isolate the thermocouple lead wires extending therethrough from one another. disposed at the top of the probe 20 is the pair of thermocouples 46 and 47. Each of these thermocouples is formed of two wires of respective dissimilar materials which, when joined, produce a thermoelectric effect. Accordingly, thermocouple 46 has its respective wires 48a and 48b intersecting as at the bead 60; and thermocouple 47 has its respectives wires 51a and 51b intersecting as at the bead 61. The wires 48a and 51a may be formed of chromel, iron, or platinum and rhodium respectively, for example. The lead wires 48(a and b) and 51 (a and b) then extend through the porcelain body of the probe 20 and out the lower portion thereof, as depicted.

The thermocouples and associated probe structure are inserted through the multiple O-rings 25 disposed in the narrow neck 26 of the tube 12, the O-rings assuring a gas tight seal to the enclosure as well as a sliding gasket for insertion of the thermocouple probe 20.

Many advantages are obtained by reason of the features just described. For example, by reason of the fact that each pair of thermocouple leads (for example 48a and 48b) are disposed directly beneath, and substantially symmetrical with respect to the vertical axis of, the thermocouple bead (for example 60), these leads are at essentially the same temperature as the associated bead; consequently, no error is introduced into the readings due to temperature differentials between the bead and the leads. Second, since each of the thermocouples 46 and 47 are integrally connected with the probe body itself, any adjustment within, or withdrawal of the probe from, the lower tube 12 for subsequent analytical runs does not necessitate readjusting the two thermocouples with respect to one another for they will remain in their same relative positions. Thus, any readjustment in the vertical position of the probe 20 to compensate for a change in position of the sample holder 18 similarly repositions the program thermocouple 46 to automatically adjust the furnace temperature.

Additionally, it is often desired to alter the balance point of the weight detection and recording system which is accomplished by releasing the clamp 13, replacing the upper enclosure 11 by another enclosure 11a, repositioning the clamp 13, the hangdown wire 30 now extending through the enclosures 11a and 12. Since the thermocouples are integrally joined with the probe 20, however, there is no necessity for completely dismantling the thermocouple structures and thereafter carefully repositioning them, as previously was the case. Furthermore, the thermocouples are easily repositioned or even replaced by sliding the probe 20 back and forth through the sliding seal in which it has been inserted. The thermocouples may then be easily and accurately located at any desired distance from the material holding cup 18.

It is to be particularly pointed out that the probe structure 20 may be utilized with only one thermocouple, which thermocouple is then used for both temperature reading as well as for controlling the programmed rate of heating of the furnace. Similarly, the many advantages of the invention are also achieved when more than two thermocouples are employed.

While the invention has been described with respect to one embodiment, various modifications to the disclosed embodiment may be made by one ordinarily skilled in the art without departing from the spirit and scope of the invention as defined by the claims.

What is claimed is:

1. Apparatus for carrying out thermogravimetric analysis of sample materials, comprising:
   a. enclosure means providing an environmentally controlled chamber,
   b. sample material holding means suspended within said enclosure means,
   c. heating means disposed about said enclosure means for heating the sample material in said holding means,
   d. weight detecting and recording means coupled to said material holding means for measuring changes in the weight of the sample material,
   e. temperature recording means including a first thermocouple formed by lead wires of respectively dissimilar material terminating in a bead portion for detecting and indicating the instantaneous temperature at said sample material holding means,
   f. control means, including a second thermocouple formed by lead wires of respectively dissimilar material terminating in a bead portion, for controlling said heating means,
   g. a single elongated probe body translatably received within an opening in the base of said enclosure means and extending axially upward into the environmentally controlled chamber, the said first and second thermocouples being carried by, and maintained in a fixed positional relationship with respect to one another by, said elongated probe body, the respective bead portions of said first and second thermocouples being disposed at the top of said probe body, the lead wires extending through the elongated probe body, and
   h. a gas tight seal disposed at said opening in the base of said enclosure means, which seal has a construction for slidably gripping said elongated probe body, thereby to enable the simultaneous adjustable positioning of the bead portions of said first and second thermocouples at desired locations with respect to said sample material holding means.

2. The apparatus as described in claim 1 wherein said gas tight seal comprises a plurality of O-rings.

3. In thermogravimetric apparatus of the type including enclosure means for providing an environmentally controlled chamber, a sample material holding means suspended within said enclosure means, heating means disposed around said enclosure for heating sample material disposed within said sample material holding means, recording means including a first thermocouple for recording the temperature at said sample material, and control means including a second thermocouple for controlling said heating means, the improvement comprising an elongated probe body of electrically insulating material adapted for translatable insertion through an opening in the base portion of said enclosure means, said first and second thermocouples being carried by, and maintained in fixed positional relationship with respect to one another by, said elongated probe body, said first and second thermocouples respectively comprising bead portions disposed at the top of said probe body and a pair of leads extending through the major portion of the length of said probe body, and gas tight seal means disposed at said opening for slidably gripping said elongated probe body, thereby to adjustably simultaneously position the bead portions of said first and second thermocouples at desired positions with respect to said sample material holding means.

4. The improvement as described in claim 3 wherein said elongated probe body maintains the respective leads of said first and second thermocouples substantially symmetrically disposed about an elongated axis passing through the bead of each thermocouple.

* * * * *